United States Patent
Cabrera et al.

(10) Patent No.: US 6,904,599 B1
(45) Date of Patent: Jun. 7, 2005

(54) STORAGE MANAGEMENT SYSTEM HAVING ABSTRACTED VOLUME PROVIDERS

(75) Inventors: Luis Felipe Cabrera, Bellevue, WA (US); Norbert P. Kusters, Woodinville, WA (US); Catharine van Ingen, Berkeley, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/450,364

(22) Filed: Nov. 29, 1999

(51) Int. Cl.[7] ............................................... G06F 9/00
(52) U.S. Cl. ..................... 719/328; 711/112; 711/114; 713/1; 714/3
(58) Field of Search ..................... 707/1–10, 100–104, 707/200–206; 709/200–253; 710/1–74; 711/1–6, 100–173, 200–221; 714/1–57; 719/311–313, 328; 713/1

(56) References Cited

U.S. PATENT DOCUMENTS

| | | | | |
|---|---|---|---|---|
| 5,408,644 A | * | 4/1995 | Schneider et al. | 714/1 |
| 6,240,511 B1 | * | 5/2001 | Blumenau et al. | 713/1 |
| 6,289,375 B1 | * | 9/2001 | Knight et al. | 709/217 |
| 6,311,213 B2 | * | 10/2001 | Dawson et al. | 709/217 |
| 6,457,139 B1 | * | 9/2002 | D'Errico et al. | 714/5 |

* cited by examiner

Primary Examiner—Meng-Al T. An
Assistant Examiner—Charles Anya
(74) Attorney, Agent, or Firm—Merchant & Gould P.C.

(57) ABSTRACT

A storage management system in which a volume provider incorporates an application programming interface (API) for receiving storage access information that characterizes high-level input/output (I/O) attributes of the storage volume such as intended access patterns, a desired level of fault handling and optimization preferences. The volume provider and the underlying storage devices conform to the specified attributes as best as possible and resolve any conflicts with the communicated attributes. The volume providers monitor the storage volumes and may reconfigure the storage volumes in order to accomplish the desired attributes.

12 Claims, 4 Drawing Sheets

STORAGE MANAGEMENT SYSTEM HAVING ABSTRACTED VOLUME PROVIDERS

"Quorum Resource Arbitrator Within A Storage Subsystem"—Ser. No. 09/449,579,

"Storage Management System Having Common Volume Manager"—Ser. No. 09/449,577,

"Volume Stacking Model"—Ser. No. 09/451,519,

"Volume Configuration Data Administration"—Ser. No. 09/450,300, and

"Volume Migration Between Volume Groups"—Ser. No. 09/451,220.

FIELD OF THE INVENTION

This invention relates generally to data storage, and more particularly to a storage management system in which volume providers provide an abstracted, high-level interface for managing storage volumes within a storage subsystem.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 1999, Microsoft Corporation, All Rights Reserved.

BACKGROUND OF THE INVENTION

As computer systems have evolved so has the availability and configuration of data storage devices, such as magnetic or optical disks. For example, these storage devices can be connected to the computer system via a bus, or they can be connected to the computer system via a wired or wireless network. In addition, the storage devices can be separate or co-located in a single cabinet.

A storage volume is a software abstraction of underlying random access storage devices, such as magnetic or optical disks, and is the smallest self-contained unit of storage exposed by an operating system and administered by a file system. Storage volumes hide the physical topology of the storage devices and may be a fraction of a disk, a whole disk or even multiple disks that are bound into a virtually contiguous range of logical blocks. This binding may increase the fault tolerance, performance, or capacity characteristics of the underlying storage devices.

One technique for improving fault tolerance, known as mirroring or plexing a disk, uses multiple disks. When data is written to one disk the data is also written to a second disk; thus the second disk is a "mirror image" of the first disk. If one disk should fail the second disk is still available for use and has an exact copy of the information on the first disk.

Volumes are constructed from one or more extents that are contiguous storage address spaces presented by the underlying storage devices. An extent is typically characterized by the size of the address space and a starting offset for the address space from a base of the media. Volume mapping is the process of mapping the contiguous address space presented by the volume onto the non-contiguous storage address spaces of the underlying extents. Volume mappings are either implemented on a specialized hardware controller, referred to as a hardware volume provider, or in software by a software volume provider.

Conventional volume providers are configured and managed with unique, vendor-specific tools. Each provider typically uses a proprietary protocol for communicating between the storage device and the driver. The volume providers often require that the administrator explicitly specify the configurations of the underlying volumes and force the administrator to make detailed, low-level configuration choices regarding the volume provider and the underlying storage devices. Because of the unique protocols and management tools of conventional volume providers, it is often difficult for an administrator to manage a system having multiple storage devices. There is a need in the art for a storage management system that does not require administrators to explicitly specify volume configurations and does not require that the administrator have detailed knowledge of the volume providers and storage devices.

SUMMARY OF THE INVENTION

The above-mentioned shortcomings, disadvantages and problems are addressed by the present invention. In one aspect, the invention is a storage management system in which a volume provider incorporates an application programming interface (API) for receiving storage access information that characterizes high-level input/output (I/O) attributes of the storage volume such as intended access patterns, a desired level of fault handling and optimization preferences. The volume provider and the underlying storage devices conform to the characterization as best as possible and resolve any conflicts with the communicated attributes. Furthermore, the volume providers monitor the storage volumes and may reconfigure the storage volumes in order to accomplish the communicated attributes.

In another aspect the invention is a method for managing one or more storage volumes of a storage subsystem. According to the invention, the method includes receiving storage access information that characterizes high-level input/output attributes of one or more of the storage volumes. The storage volumes of the storage subsystem are then configured as a function of the input/output attributes characterized by the storage access information.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an exemplary embodiment of the invention are provided. In the fourth section, an exemplary embodiment of the invention is provided. Finally, in the fifth section, a conclusion of the detailed description is provided.

Definitions

Compromised—a status indicating that a fault tolerant volume is missing one or more disk or volume extents; for example, a mirror set with only one mirror currently available.

Configuration data—describes the mapping of physical resources to logical volumes.

Directed configuration—provider is explicitly provided with rules for choosing logical block remapping.

Disk platter—a subset of a diskpack, used for exporting or importing volumes from a diskpack.

Diskpack—a collection of logical volumes and underlying disks. A diskpack is the unit of transitive closure for a volume.

Export—Move a disk platter and all volumes contained on that platter out of one diskpack.

Exposed—a volume is exposed to an operating system when the volume has an associated volume name (drive letter). The volume can be made available to a file system or other data store.

Free agent drive—a disk drive which is not a member of a disk pack. Free agent drives cannot contain logical volumes that are exposed.

Health—volume fault management status. A volume can be initializing, healthy, compromised, unhealthy, or rebuilding.

Healthy—containing or able to contain valid data.

Hot-spotting—temporary plexing of a volume or collection of volume extents.

Import—Move a disk platter and all volumes contained on that platter into one diskpack.

Initializing—a status indicating that a volume is rediscovering volume configuration.

LBN—logical block number.

Logical block mapping—relationship between the logical blocks exposed to the logical volume provider to those exposed by the same provider.

Logical volume provider—software which exposes logical volumes. A provider includes runtime services, configuration data, and management services.

Management service—software used to perform volume configuration, monitoring or fault handling.

Mapped volume—a simple linearly logical block mapping which concatenates volumes to expose a single larger volume.

Mirrored volume—logical volume which maintains two or more identical data copies. Also termed RAID 1.

Parity striped volume—logical volume which maintains parity check information as well as data. The exact mapping and protection scheme is vendor-specific. Includes RAID 3, 4, 5, 6.

Plexed volume—dynamic mirror volume. Plexing is used to create a copy of a volume rather than to provide fault tolerance. The mirror is added to the volume with the intent of removal after the contents have been synchronized.

Raid—Redundant Array of Independent Disks.

Rebuilding—a status indicating that a previously compromised fault tolerant volume is resynchronizing all volume extent data.

Runtime service—software that executes on a per-IO request basis.

SCSI—Small-Computer Systems Interface.

Stacked volume—a volume that has been constructed by more than one logical block mapping operation. An example is a stripe set of mirror volumes. Stacking includes stripping, mapping, and plexing.

Striped volume—a logical block mapping which distributes contiguous logical volume extents across multiple volumes. Also termed RAID 0.

Unhealthy—a status indicating that a non-fault tolerant volume missing one or more disk or volume extents; data contained on unhealthy volumes must not be accessed.

Volume configuration stability—status to denote whether volume logical to physical mapping is undergoing change. A volume may be stable, extending, shrinking, plexing, or remapping.

Volume extent—a contiguous range of logical blocks contained on a volume. Volume extents are the smallest managed logical volume unit.

Volume status—status to denote current use of a volume by the system. A volume may be unused, hot spare, mapped, used, or unknown.

Hardware and Operating Environment

Figure 1:
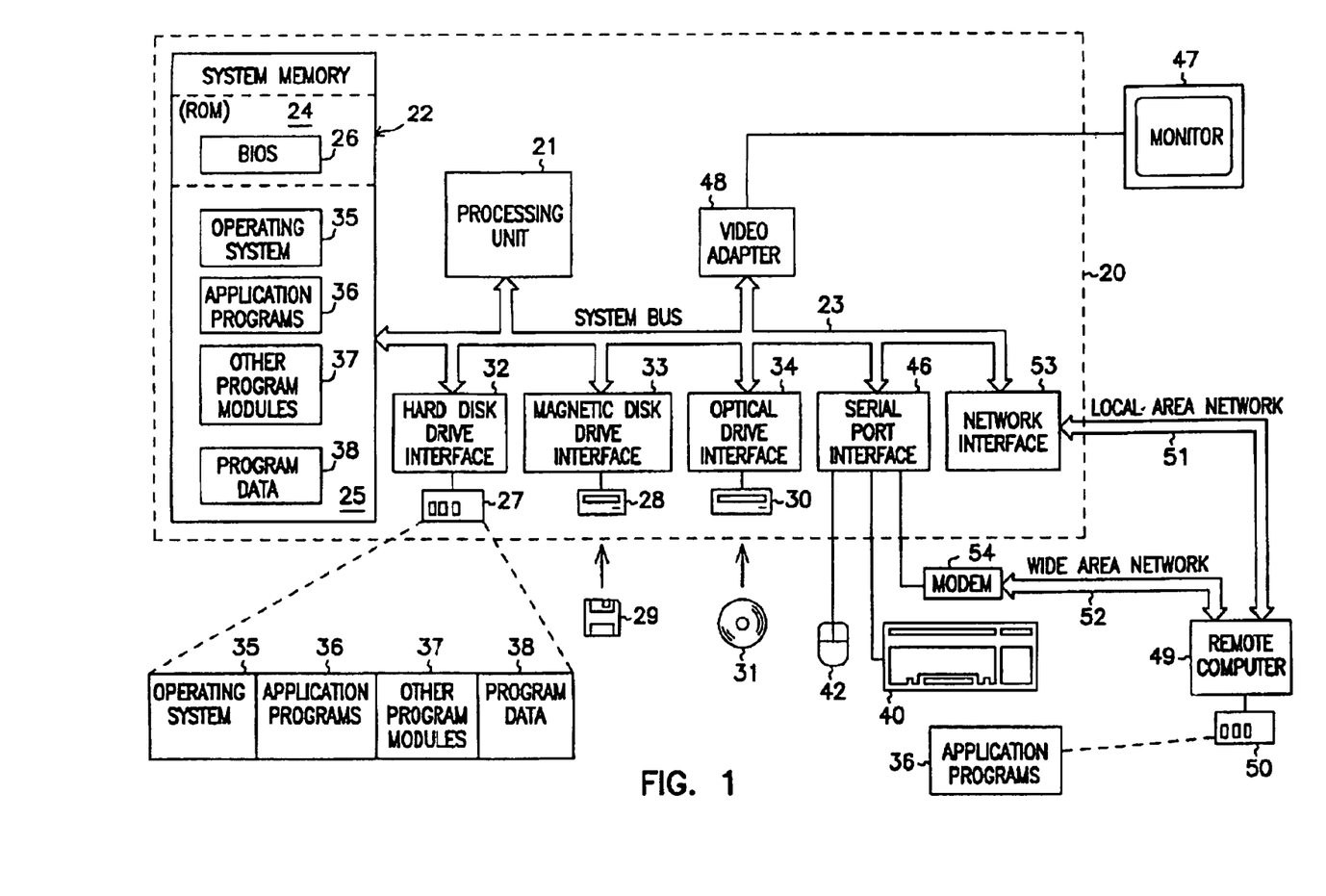
FIG. 1 shows a diagram of the hardware and operating environment in conjunction with which embodiments of the invention can be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc. that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk 27, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20, the local computer, the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple to other computers.

System Level Overview

Figure 2:
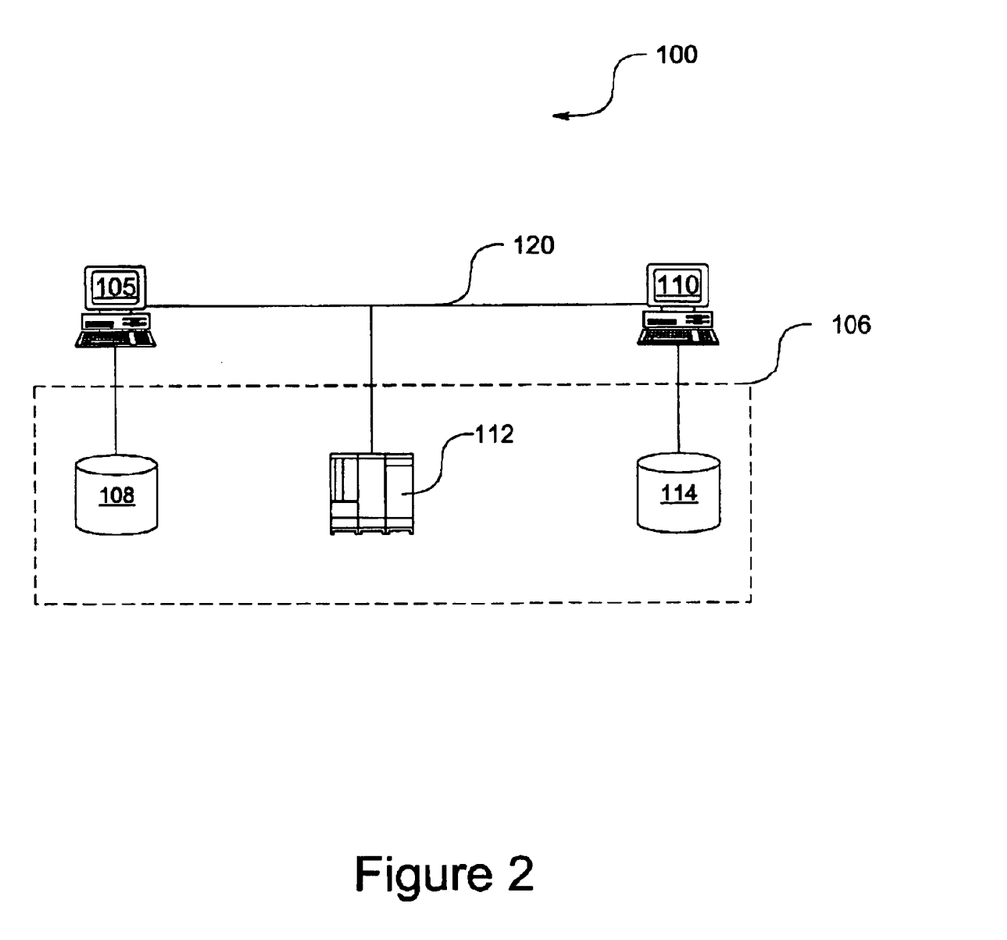
FIG. 2 is a block diagram illustrating a system-level overview of a storage subsystem having two nodes and a variety of storage devices.

FIG. 2 is a block diagram illustrating a system-level overview of storage subsystem 100 that includes computer 105, computer 110 and storage devices 106 that are communicatively coupled via network 120. Computers 105 and 110 represent any suitable computing system such as local computer 20 or remote computer 49 in FIG. 1. Storage devices 106 includes that includes storage device 108, storage device 112, and storage device 114 that may be any suitable storage medium such as a single internal disk, multiple external disks or even a RAID cabinet. Storage devices 106 need not be homogeneous in size, performance characteristics, or physical media.

In the embodiment illustrated by FIG. 1, storage devices 108 and 114 are directly connected to computers 105 and 110, respectively while storage device 112 is directly connected to network 120 and is a RAID storage cabinet having multiple disks. Storage devices 106 have corresponding volume providers (not shown) to map logical storage volumes onto one or more storage devices 106 of storage subsystem 100. These volume providers may be implemented in either software or hardware and may reside within the respective storage devices 108, 112 and 114 or within computers 105 and 110. As illustrated in detail below, the abstracted volume providers present a high-level interface that allows administrators to manage the volume providers and the underlying storage devices 106 without requiring that the administrator explicitly specify low-level configuration settings.

Figure 3:
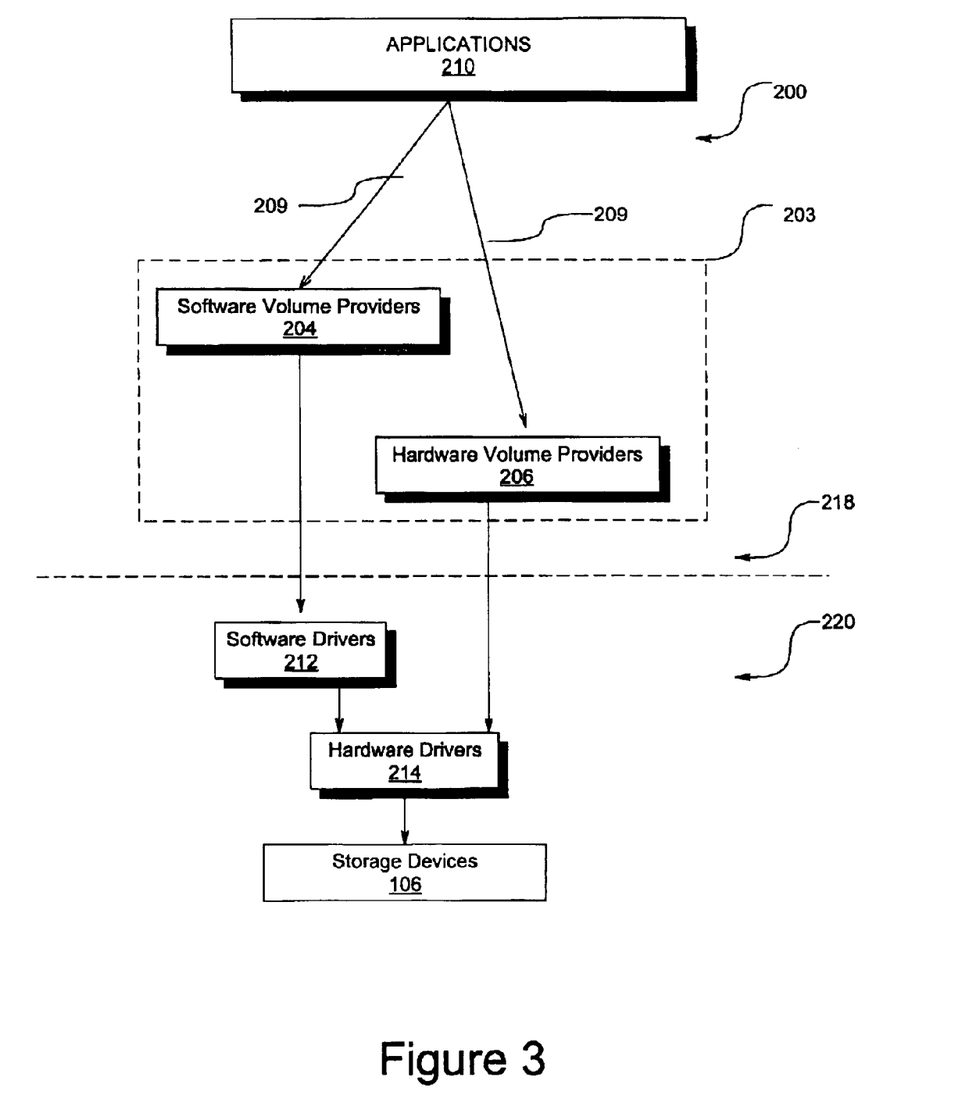
FIG. 3 is a block diagram illustrating one embodiment of a storage management system for managing one or more storage volumes of a storage subsystem according to the invention.

FIG. 3 is a block diagram illustrating one embodiment of an inventive storage management system 200 for managing various volume providers 203 of storage subsystem 100 (FIG. 1). Storage management system 200 includes applications 210, volume providers 203 that execute in user space 218. Application 210 can be a management-type software application used by a system administrator to configure volumes or can be a user-type application that accesses the storage devices 106. As illustrated in FIG. 3, volume providers 203 consist of software volume providers 204 and hardware volume providers 206 that execute in user space 218. In other embodiments volume providers 203 execute in any combination of user space 218 and kernel space 220. Drivers 212 and 214 support run-time services that are provided by the operating system and execute in kernel space 220. Volume providers 203 perform all management tasks such as volume configuration, performance monitoring and dynamic event handling.

Each volume provider 203 within storage management system 200 has a corresponding hardware driver 214. In addition, a software volume provider 204 interfaces to software driver 212 that controls hardware driver 214. Drivers 212 and 214 handle all communications with storage devices 106 any may implement one of a variety of protocols such as SCSI ("Small-Computer Systems Interface"), IP ("Internet Protocol"), etc. Drivers 212 and 214 support the run-time services that are provided by the operating system.

According to the invention, volume providers 203 provide applications 210 with a high-level, attribute-based view of storage devices 106. More specifically, applications 210 communicate storage access information to volume providers 203 via Application Programming Interface ("API") 209. The storage access information allows applications 210 to communicate volume behavioral attributes instead of explicitly configuring volume providers 203. The storage access information includes input/output characteristics, data availability desires and physical mapping constraints. For example, in one embodiment the storage access information includes a desired level of fault tolerance. In another embodiment the storage access information communicated via API 209 allows applications 210 to characterize intended access patterns such as whether a volume is primarily intended for sequential reads or writes, predominantly read-only, etc. The storage access information may also include suggested configuration parameters such as request size and alignment. Finally, via API 209, applications 210 may communicate storage access information that suggests how a volume should be optimized, such as for safety of data or for access performance.

Based on the storage access information, volume providers 203 perform all disk extent mapping, disk space allocation and mapping type selection. More specifically, volume providers 203 implement sophisticated configuration rules for configuring storage devices 106 based on the storage access information received from applications 210. Thus, API 209 allows applications 210 to manage volume providers 203 without requiring that applications 210 have detailed knowledge of their underlying policies or the physical characteristics of storage devices 106. In this manner, API 209 shields applications 210 from these complex, vendor-specific rules such that an administrator need not be an expert in logical volume management. In addition, API 209 allows applications 210 to manage volume providers 203 without requiring that applications 210 explicitly specify preferred volume configurations.

According to the invention, volume providers 203 are not required to configure storage device 106 so as to strictly conform to the storage access information provided by API 209. To the contrary, volume providers 203 attempt to configure storage devices 106 in consideration of the storage access information communicated via management-type applications 210 as well as storage access patterns imposed by user-type applications 210. For example, a volume provider 203 could implement a single parity stripe interleave size and ignore information about additional interleave sizes. Volume providers 203 resolve conflicting storage access information without limitation. In the case of a conflict, volume providers 203 attempt to complete the requested operation and report the actual configuration to applications 210.

After configuring storage devices 106, volume providers 203 monitor access patterns of applications 210 and perform dynamic reconfiguration of a volume in response to changes in the input/output (I/O) pattern. For example, based on a change in I/O pattern, volume providers 203 may move logical volume extents within storage devices 106, change configuration parameters such as interleave factors, or change volume type such as substituting a parity stripe volume for a mirror set. One example is to relocate "hot-areas" of a volume, i.e. areas having a high rate of access requests, onto a set of disk that can be accessed in parallel A second example is the identification of an area of a volume that is always accessed sequentially. Volume providers 203 may stripe such an area in order to help standard read-ahead policies.

In one embodiment, however, an administrator can disable reconfiguration, effectively freezing volume configuration.

Although the volume providers 203 must conform to API 209, the invention places no restraints on how volume providers 203 communicate with the software drivers 212 or hardware drivers 214 and may use any preferred protocol. In this fashion, storage management system 200 requires no changes to conventional drivers 212 and 214. Thus, vendors of storage devices 106 are free to develop their own communication protocols.

The system level overview of the operation of an exemplary embodiment of the invention has been described in this section of the detailed description. Volume providers provide applications with a high-level, attribute-based view of storage devices. Furthermore, the volume providers present a high-level API that allows administrators to manage the volume providers and the underlying storage devices 106 without requiring that the administrator explicitly specify low-level configuration settings.

Methods of an Exemplary Embodiment of the Invention

In the previous section, a system level overview of the operation of an exemplary embodiment of the invention was described. In this section, the particular methods performed by a computer executing an exemplary embodiment is described by reference to a series of flowcharts. The methods to be performed by a computer constitutes computer programs made up of computer-executable instructions. Describing the methods by reference to a flowchart enables one skilled in the art to develop such programs including such instructions to carry out the methods on suitable computers (the processor of the computers executing the instructions from computer-readable media).

Figure 4:
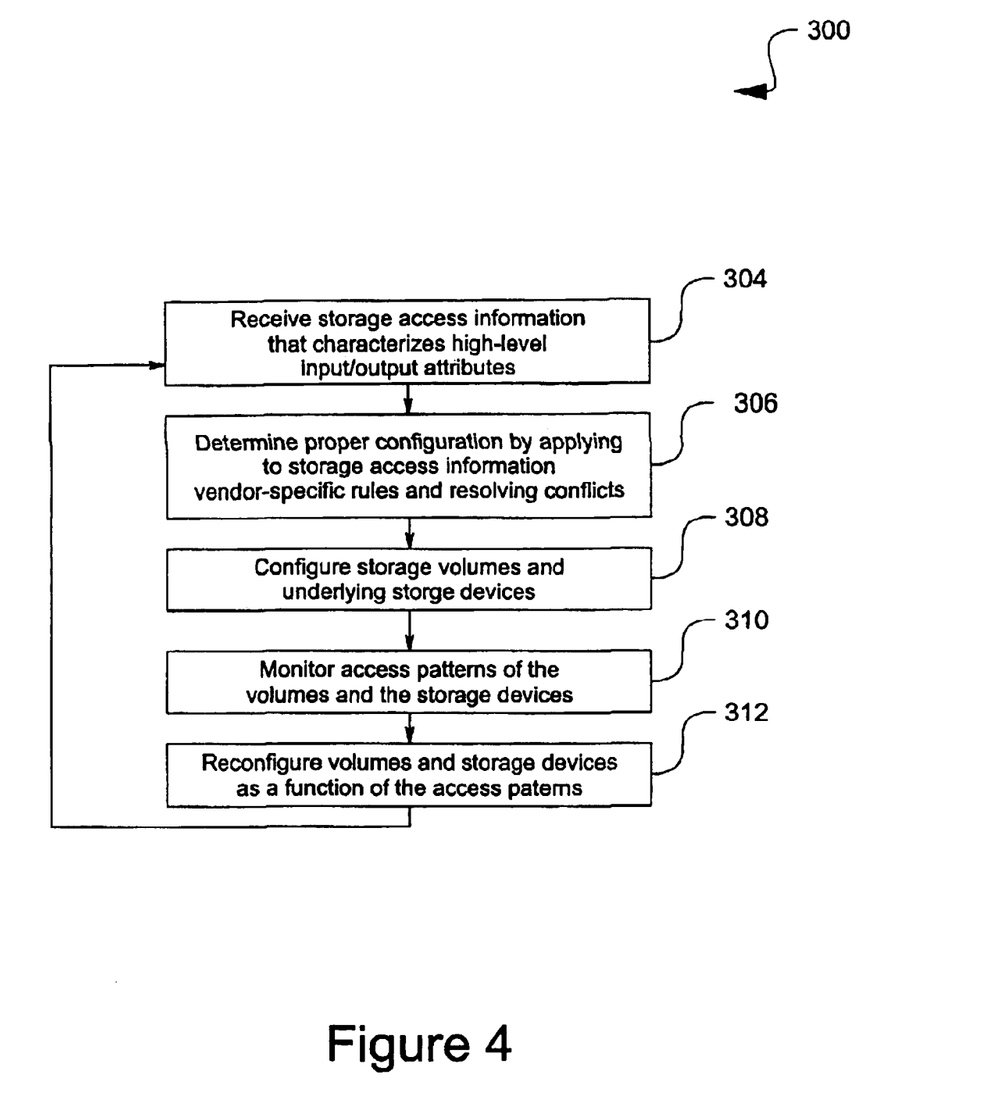
FIG. 4 is a flowchart illustrating one mode of operation of the inventive storage management system.

FIG. 4 is a flowchart 300 illustrating one exemplary method of operation of a volume provider 203 (FIG. 3) for managing the corresponding volumes and storage devices 106 (FIG. 2) of storage subsystem 100. The volume provider 203 begins flowchart 300 with block 304. In block 304, a volume provider 203 receives storage access information from applications 210 via API 209. As discussed in detail above, the storage access information characterizes input/output (I/O) attributes of the storage volume such as intended access patterns and optimization preferences.

In block 306 the volume provider 203 determines a configuration for storage devices 106 based on the storage access information including all disk extent mappings. In order to determine the configuration, the volume provider 203 may apply industry standard rules as well as vendor-specific rules. Industry standard rules precisely define certain configurations such as striping with parity and mirroring. Using vendor-specific characteristics, for example, volume providers 203 can make more intelligent decisions such as which storage device 106 to use for parity in a RAID-4 configuration, how to balance the stripes across a set of disks, or which pairs of devices to use for a mirror set. In block 308, the volume provider 203 configures those volumes and storage devices 106 of which it has control.

In blocks 310 and 312, the volume provider 203 monitors access patterns of applications 210 and dynamically reconfigures the volumes of storage devices 106 based on previously received storage access information and any detected changes in the input/output (I/O) patterns of applications 210. For example, a volume provider 203 could reasonably configure a volume as parity stripe (RAID-5) if the storage access information indicated that the volume was to be primarily read-only. The volume provider 203 could then change the parity stripe to a mirror (RAID-1) in the event that the actual load was heavily write. As another example, a volume provider could determine that fault-tolerant, single-disk volume should be concatenated or striped across two disks to distribute load. Volume providers 203 repeat blocks 304 through 312 upon receiving new storage access information from applications 210.

An Exemplary Embodiment of the API Provided by the Volume Providers

Listed below is one embodiment of storage access information that applications 210 communicate to volume providers 203 via API 209:

IsFaultTolerant—Use a fault tolerant, mirror or parity stripe volume.

FastCrashRecoveryRequired—Bound the time required for volume recovery; support for fast recovery involves use of some sort of change log enabling the provider to recover the volume without comparing the entire contents.

IsRemovable—Volume can be physically removed with minimal system disruption; occupy minimal number of spindles or removable media.

OptimizeForSequentialReads—Optimize for a sequential read or sequential write pattern.

OptimizeForSequentialWrites—Optimize for a sequential write pattern. If this setting and OptimizeForSequentialReads are both false then optimize for random input/output.

IsMostlyReads —Optimize for read mostly pattern, for example by use of mirroring rather than parity striping.

ReconfigurationOk—Allow the extents in a volume to move within the storage device. If false, mapping of volume extents to disk extents remains fixed after configuration with the exception of actions necessary to avoid disk failures.

ExpectedMaximumSize—Maximum size to which the volume is likely to grow. May be greater or less than VolumeSize.

OptimalReadSize—Optimal read size in bytes with respect to the first logical block of the volume.

OptimalReadAlignment—Optimal read alignment with respect to the first logical block of the volume.

OptimalWriteSize—Optimal write size in bytes with respect to the first logical block of the volume.

OptimalWriteAlignment—Optimal write alignment with respect to the first logical block of the volume.

MaximumNumberOfSpindles—Maximum number of disk spindles contributing to the volume. May be used to limit the number of stripe chunks in a stripe set.

InterleaveSize—Mirror or parity stripe chunk size. Number of contiguous logical blocks per disk extent prior to changing disk extents.

RebuildPriority—Relative priority (low:high) for rebuild. Low causes less system impact, but extents the period of exposure.

Conclusion

Various embodiments of the inventive storage management system have been described in which abstracted volume providers incorporate a generalized API by which administrators manage the volume providers and the underlying storage devices. The API allows an administrator to communicate storage access information that characterizes high-level input/output attributes of the storage devices such as intended access patterns, preferred fault handling and suggested parameters for optimization. The volume providers configure the underlying storage devices in a manner that satisfies the storage access information in light of any conflicts with the storage access information. The volume providers monitor subsequent input/output access patterns and may reconfigure the storage devices in order to accomplish the specified high-level storage attributes. It is intended that only the claims and equivalents thereof limit this invention.

We claim:

1. A storage management system on a computer comprising:

a volume provider to map a logical storage volume onto one or more storage devices of a storage subsystem, wherein the volume provider presents an application programming interface (API), the API conforming to Component Object Model (COM) interface, to applications on the computer;

the API for receiving first desired behavioral attributes of the logical storage volume;

the volume provider reconfigures the logical storage volume of the one or more storage devices by monitoring and comparing access patterns of the logical storage volume using the first attributes received from a first application and second desired behavioral attributes previously received via the API from a second application, wherein the volume provider reconfigures the logical storage volume if the access patterns differs from the first or second desired behavioral attributes; and wherein the first and second attributes are selected from a set of predefined attributes including fault tolerance attribute, a fast crash recovery required attribute, a removable attribute, an optimize for sequential reads attribute, an optimize for sequential writes attributes, an optimize for mostly reads attribute, a reconfiguration allowed attribute, an expected maximum size attribute, an optimal read size attribute, an optimal read alignment attribute, optimal write attribute, an optimal write alignment attribute, a maximum number spindles attribute, an interleave size attribute, and a rebuild priority attribute.

2. The storage management system of claim 1 wherein the volume provider resolves conflicts between the first desired behavioral attributes and the second desired behavioral attributes.

3. The storage management system of claim 1, wherein the first and second applications have no knowledge of the physical characteristics of the one or more storage devices of the storage subsystem.

4. The storage management system of claim 3 wherein the second application is an administrative tool that issues the second desired behavioral attributes to the volume provider in response to input from an administrator.

5. A method for managing one or more storage volumes of a storage subsystem by a computer comprising:

receiving, via application programming interface (API), the API conforming to Component Object Model (COM) interface, presented by a volume provider to applications on the computer, first storage access information from a first application;

previously received, from a second application via the API, second storage access information;

reconfiguring, by the volume provider, one or more logical storage volumes of the storage subsystem as a function of the first and second storage access information, by monitoring and comparing access patterns of the logical storage volume, wherein the reconfiguring by the volume provider occurs if the access patterns differs from the first or second storage access information; and wherein the first and second storage access information are selected from a set of predefined attributes including fault tolerance attribute, a fast crash recovery required attribute, a removable attribute, an optimize for sequential reads attribute, an optimize for sequential writes attributes, an optimize for mostly reads attribute, a reconfiguration allowed attribute, an expected maximum size attribute, an optimal read size attribute, an optimal read alignment attribute, optimal write attribute, an optimal write alignment attribute, a maximum number spindles attribute, an interleave, and a rebuild priority attribute.

6. The method of claim 5 wherein configuring includes resolving conflicts between the first and second storage access information.

7. A computer-readable medium having computer-executable instructions to cause a computer to perform a method of:

receiving, from a first application via an application programming interface (API), the API conforming to Component Object Model (COM) interface, presented by volume provider to applications on the computer, first storage access information that characterizes desired volume behavioral attributes of one or more storage volumes when stored on a storage subsystem;

receiving, from a second application via the API, second storage access information that characterizes desired volume behavioral attributes of one or more storage volumes;

reconfiguring, by the volume provider, the one or more storage volumes of the storage subsystem based on the first and second access information by monitoring and comparing access patterns of the one or more storage volume, wherein the reconfiguring by the volume provider occurs if the access patterns differs from the first or second storage access information; and wherein the first and second storage access information are selected from a set of predefined attributes including fault tolerance attribute, a fast crash recovery required attribute, a removable attribute, an optimize for sequential reads attribute, an optimize for sequential writes attributes, an optimize for mostly reads attribute, a reconfiguration allowed attribute, an expected maximum size attribute, an optimal read size attribute, an optimal read alignment attribute, optimal write attribute, an optimal write alignment attribute, a maximum number spindles attribute, an interleave, and a rebuild priority attribute.

8. The method for configuring a logical volume onto a storage device comprising:

receiving, by an application programming interface (API), the API conforming to Component Object Model (COM) interface, exposed by a volume provider to applications on a computer, first desired behavioral attributes for the logical volume form a first application, the first behavioral attributes independent of the storage device physical characteristics;

receiving, by the API, second desired behavioral attributes for the logical volume from a second application on the computer;

the volume provider reconfigures the logical storage volume of the storage devices by monitoring and comparing access patterns of the logical storage volume using the first desired behavioral attributes received from a first application and second desired behavioral attributes previously received via the API from a second application, wherein the volume provider reconfigures the logical storage volume if the access patterns differs from the first or second desired behavioral attributes; and wherein the first and second desired behavioral attributes are selected from a set of predefined attributes including fault tolerance attribute, a fast crash recovery required attribute, a removable attribute, an optimize for sequential reads attribute, an optimize for sequential writes attributes, an optimize for mostly reads attribute, a reconfiguration allowed attribute, an expected maximum size attribute, an optimal read size attribute, an optimal read alignment attribute, optimal write attribute, an optimal write alignment attribute, a maximum number spindles attribute, an interleave size attribute, and a rebuild priority attribute.

9. The method of claim 8 further comprising:

resolving conflicts between the first desired behavioral attributes and the second desired behavioral attributes.

10. The method of claim 8 further comprising:

reporting to the first application an actual configuration of the logical volume.

11. The method of claim 8 wherein configuring comprising:

storing configuration rules associating desired behavioral attributes with logical volume configurations based on the storage device physical characteristics; and configuring the logical volume based on the first and second desired behavioral attributes, the configuration rules, and the storage device physical characteristics.

12. The method of claim 8 further comprising: determining, by the first application, the first desired behavioral attributes of the logical volume.

* * * * *